Aug. 17, 1971 J. W. DERENTHAL 3,600,253

APPARATUS FOR APPLYING ADHESIVE TAPE AROUND PACKAGES

Filed Sept. 17, 1968 7 Sheets-Sheet 1

INVENTOR
Jerome W. Derenthal
BY
Curtis Morris & Safford
ATTORNEYS

APPARATUS FOR APPLYING ADHESIVE TAPE AROUND PACKAGES

Filed Sept. 17, 1968

APPARATUS FOR APPLYING ADHESIVE TAPE AROUND PACKAGES

Filed Sept. 17, 1968 7 Sheets-Sheet 3

Aug. 17, 1971 J. W. DERENTHAL 3,600,253

APPARATUS FOR APPLYING ADHESIVE TAPE AROUND PACKAGES

Filed Sept. 17, 1968 7 Sheets-Sheet 4

United States Patent Office 3,600,253

Patented Aug. 17, 1971

3,600,253
APPARATUS FOR APPLYING ADHESIVE TAPE AROUND PACKAGES

Jerome W. Derenthal, Succasunna, N.J., assignor to Stapling Machines Co., Rockaway, N.J.

Filed Sept. 17, 1968, Ser. No. 760,145
Int. Cl. B65b *13/10*
U.S. Cl. 156—468 7 Claims

ABSTRACT OF THE DISCLOSURE

A machine for applying adhesive tape around a package which includes a tape starter for pressing the leading end of the tape against the package, a tape supply assembly rotatable around the package, a tape cutter to sever the tape after one revolution of the tape supply assembly, a tape presser to engage the trailing cut end of the tape and press it against the package, and a tape holder for engaging the leading end of the unused tape to hold it in position for engagement by the tape starter at the beginning of the next cycle.

This invention relates to a machine for applying adhesive tape, particularly pressure sensitive adhesive tape, around packages of various sizes.

Among the objects of the invention is the provision of such a machine which includes means for automatically applying the leading end of the tape to the package, cutting the tape to proper length after it has been wrapped substantially around the package, pressing the trailing cut end of tape against the package, and holding the leading end of the unused tape in position for the start of the next cycle.

Another object is that of providing such a machine which includes means for controlling the degree of tension imposed on the tape as it is wrapped around the package and accordingly the degree of pressure applied to the package.

A further object is the provision of such a machine which includes means to prevent "backlash" of the tape due to the inertia of the tape supply roll.

Still another object is that of providing such a machine which is simple and economical in construction and reliable in operation.

Figure 1:
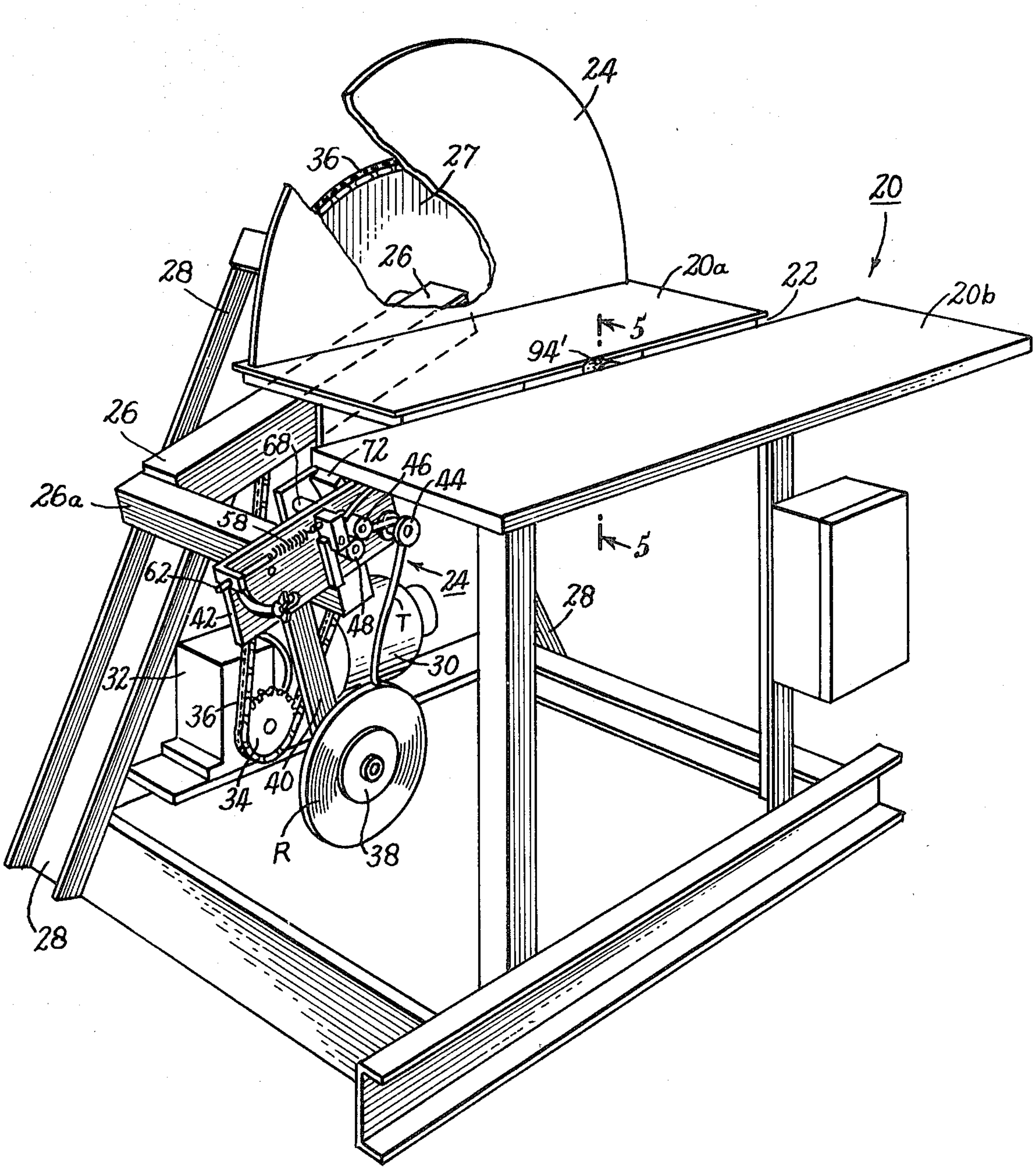
FIG. 1 is a perspective view of an illustrative taping machine embodying features of the invention.

As may be seen in FIG. 1, the illustrative machine includes a supporting table, generally designated 20, divided into two coplanar horizontal portions **20*a* and 20*b*, spaced apart to leave between them a gap 22 through which the tape is to be applied to the bottom of a package resting on the table. A vertical end wall 23 is adjustably positioned on the table portion 20*a* to serve as an abutment against which the package is placed to facilitate proper positioning of the package relative to the gap 22**.

The tape supply assembly, generally designated 24, is mounted at the end of a lateral extension **26*a* at the outer end of a radial arm 26 whose inner end is fixed relative to a sprocket 27 rotatably supported at one side of the table at the apex of a pair of legs 28 arranged in an inverted V. Thus the tape supply assembly may be rotated in a circular path about the table 20. It is driven by means of an electric motor 30 through a clutch and brake assembly (not shown in FIG. 1), a speed reducer 32, a sprocket 34 and a chain 36 which is trained about the aforementioned sprocket 27**.

Figures 2, 3:
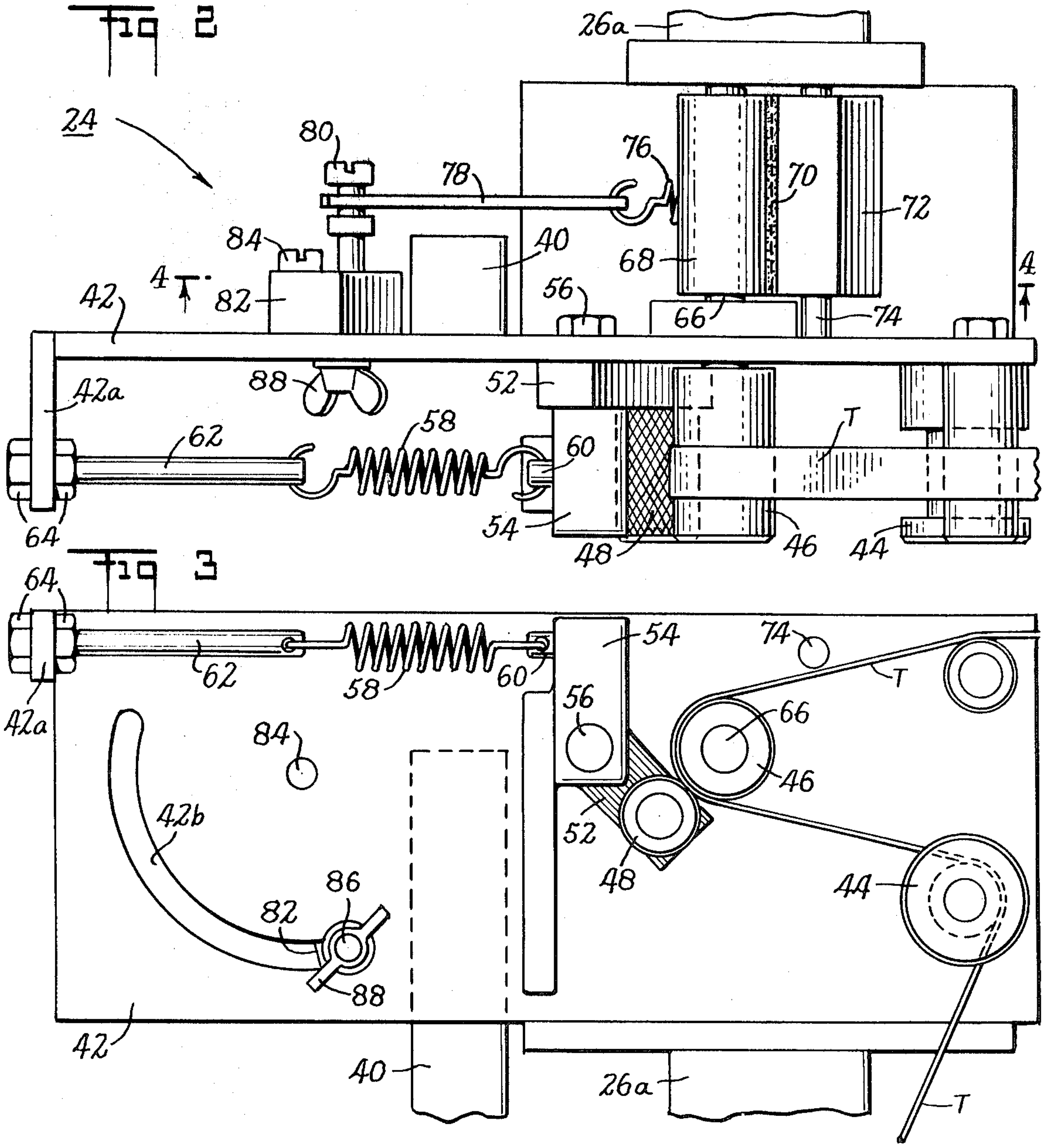
FIGS. 2 and 3 are enlarged fragmentary plan and elevational views, respectively, of the tape supply assembly.
Figure 4:
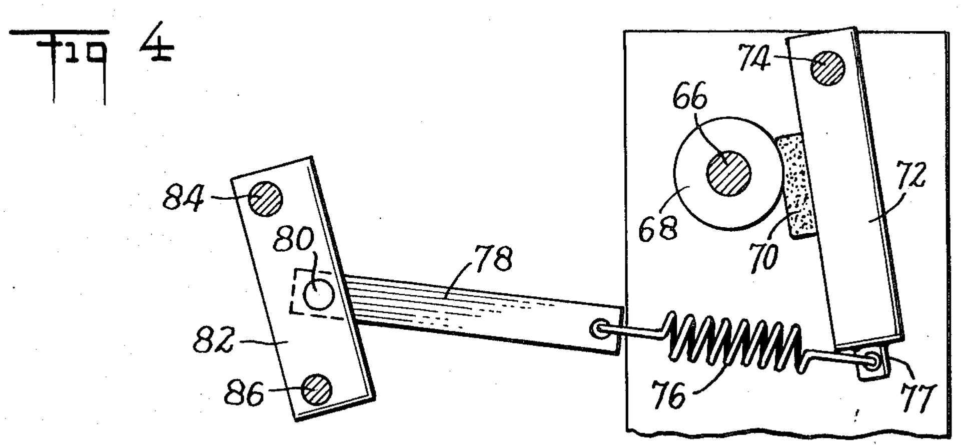
FIG. 4 is a vertical sectional view taken on the line 4—4 of FIG. 2.

The tape supply assembly 24 includes a roll R of adhesive tape rotatably supported, in the same vertical plane as the gap 22, on an overrunning clutch 38 mounted at the outer end of an arm 40 extending from the mounting plate 42. The arrangement of the other parts of the tape supply assembly on its mounting plate 42 is best shown in FIGS. 2, 3 and 4.

As may be seen in these figures, the web of tape T extending from the roll R (FIG. 1) passes first around a flanged idler guide roller 44 which aids in maintaining proper transverse alignment of the tape in the vertical plane of the gap 22. The tape T extends from the roller 44 between a tension roller 46 and a pressure roller 48. The gummed face of the tape engages the pressure roller 48, the surface of which is serrated to prevent the tape T from adhering to it. The pressure roller 48 is rotatably mounted on a shaft 50 at one end of an arm 52 which projects from a block 54 rotatably supported on a shaft 56 projecting from the mounting plate 42. The block 54, arm 52 and pressure roller 48 are urged in a counterclockwise direction, as viewed in FIG. 3, by a tension spring 58 which is connected at one end to a stud 60 at the upper end of the block 54 and at the other end to a tension-adjusting screw 62 which is adjustably secured to a bracket **42*a* at the edge of the mounting plate 42 by lock nuts 64. Thus the pressure roller 48 is yieldably urged into engagement with the tape T backed by the tension roller 46**.

The tension roller 46 is fixed on a shaft 66 rotatably supported in and projecting through the mounting plate 42. Keyed to the oposite end of the shaft 66 is a brake cylinder 68 which is frictionally engaged by a brake pad 70 of resilient material secured to a plate 72 pivotally mounted on a shaft 74 projecting from the rear of the mounting plate 42. The brake pad 70 is yieldably urged against the brake cylinder 68 by a tension spring 76, one end of which is hooked through a pin 77 at the lower end of the plate 72 and the other end of which is hooked through the end of a link 78. The opposite end of the link 78 is pivotally attached by a bolt 80 to the central part of a lever 82 whose upper end is pivoted on a bolt 84 threaded into the mounting plate 42. At the lower end of the lever 82, a locking bolt 86 projects through the lever 82 and through an adjusting slot **42*b* in the mounting plate 42, the slot 42*b* being in the form of a quadrantial circular arc concentric with the pivot bolt 84. The lever 82 may thus be pivoted through an arc of approximately 90°, varying the tension on the spring 76 and accordingly the friction of the brake pad 70 and brake cylinder 68 and thus controlling the drag imposed on the tension roller 46. This determines the tension required to pull the tape from the tape supply assembly and accordingly the pressure applied to the package as the tape is wound around it. A wing nut 88 on the bolt engages the front face of the mounting plate 42 and locks the lever 82** in the adjusted position.

Figure 5:
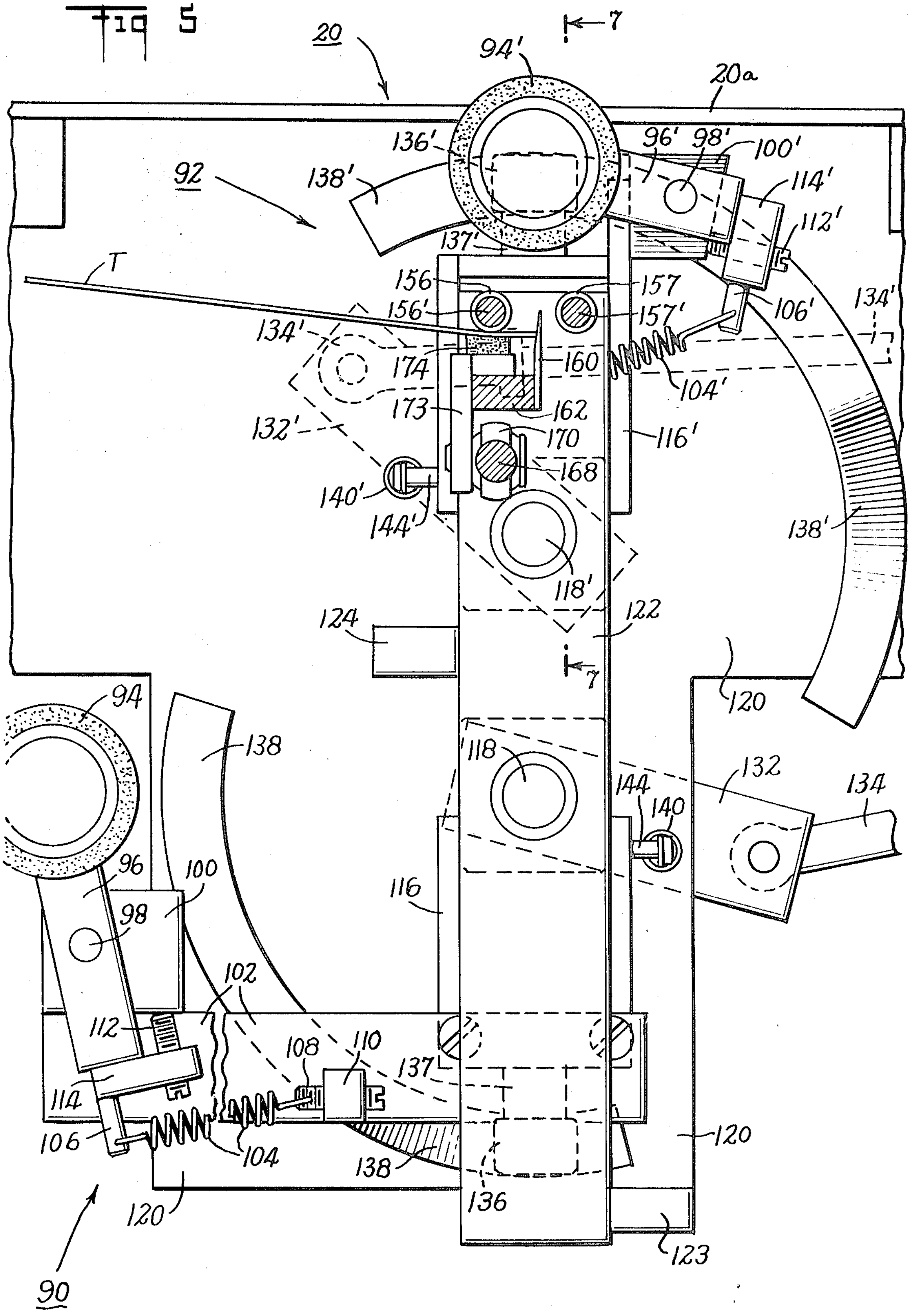
FIG. 5 is an enlarged fragmentary vertical sectional view taken generally along the line 5—5 of FIG. 1.
Figure 6:
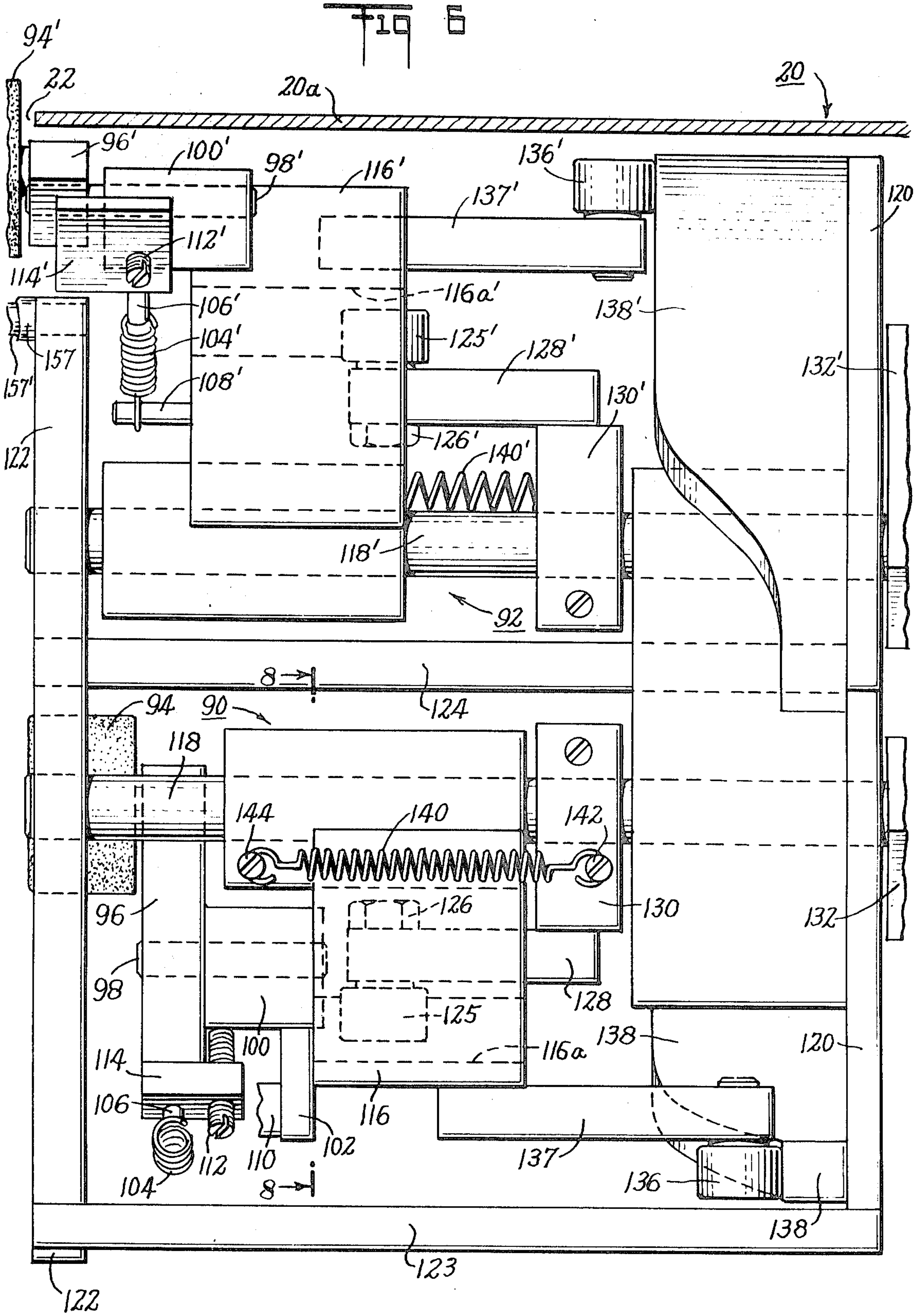
FIGS. 6 and 7 are end elevational views of adjacent and slightly overlapping portions of the mechanism shown in FIG. 5.
Figure 8:
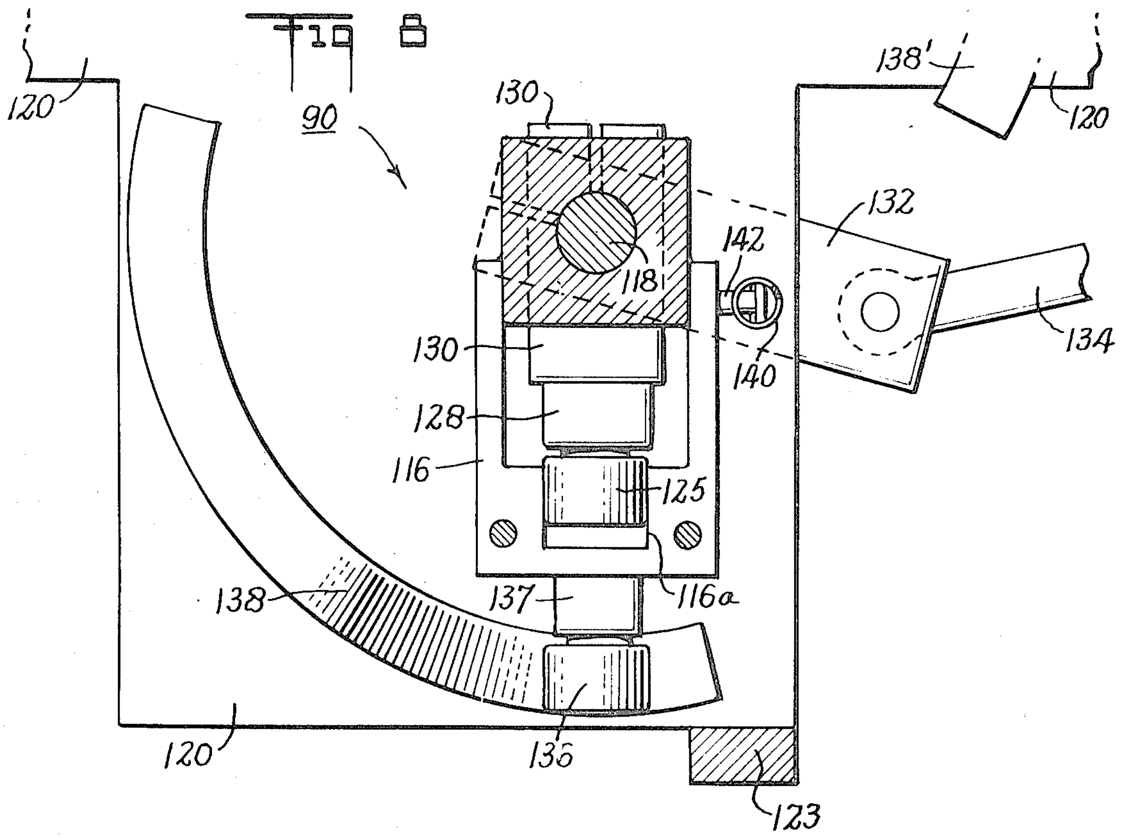
FIG. 8 is a fragmentary vertical sectional view taken on the line 8—8 of FIG. 6.

FIGS. 5, 6 and 8 illustrate the mechanisms which apply the two end portions of the loop of tape to the package at the start and finish of the taping operation.

The tape applying mechanism, generally designated 90, presses the leading end of the tape against the bottom of the package at the start of the taping operation. Then, after the tape supply assembly has completed a revolution around the table 20 to wrap the tape around the package, the tape is cut by the tape cutting mechanism shown in FIG. 7, and then the tape pressing mechanism, generally designated 92, presses the trailing cut end of the tape against the package.

The tape applying mechanism 90 and the tape pressing mechanism 92 are virtually identical in construction, except that the positions of their components are reversed and they operate in opposite directions. Thus, for purposes of brevity, they will be described together, using the reference numerals applied to the components of the tape applying mechanism 90. The same numerals, followed by a prime sign ('), are applied to the corresponding components of the tape pressing mechanism 92.

Each mechanism includes a tape engaging roller 94 rotatably mounted at the end of a lever 96 pivotally supported on a bolt 98 threaded into a block 100 at the outer end of an arm 102. The roller 94 is yieldably urged outwardly (toward the package when the roller is in package-engaging position) by a tension spring 104, one end of which is hooked through a pin 106 at the opposite end of the lever 96 and the other end of which is hooked through a screw 108 adjustably threaded through a tab 110 on the arm 102. The outward movement of the roller 94 is limited by a stop screw 112 threaded through a tab 114 on the lever 96 and engaging the block 110. The inner end of the arm 102 is fixed to a block 116 which is rotatably and slidably supported on a shaft 118 whose two ends are respectively supported in the mounting plate 120 and in a bar 122 supported in spaced, parallel relation therewith by spacer bars 123 and 124.

As best shown in FIG. 8, the block 116 is hollow and is provided with an internal slideway **116*a* which extends parallel to the shaft 118 and receives a roller 125 rotatably mounted on a bolt 126 at one end of a horizontal arm 128 whose opposite end is secured to a block 130 keyed on the shaft 118. The shaft 118 is actuated by means of a crank arm 132, one end of which is keyed to the shaft 118 and the other end of which is pivotally attached to a link 134 extending from the piston rod of an air cylinder (not shown). Actuation of the air cylinder rocks the shaft 118 in a clockwise direction, as viewed in FIGS. 5 and 8 through an arc of approximately 90°, swinging the block 130, arm 128 and roller 125 and, through engagement of the roller 125 with the slideway 116*a*, swinging the block 116 through a similar angle and moving the tape engaging roller 94 from a retracted position below the table 20 to an upper position at which it is normally slightly above the level of the table surface but, if a package is on the table, it will be pressed downwardly against the resistance of the spring 104**, to maintain pressure against the package.

During such arcuate movement of the block 116 rides along a sector crown cam 138 which is fastened to the mounting plate 120. The roller 136 is maintained in engagement with the surface of the cam 138 by a tension spring 140, one end of which is hooked about a screw 142 on the block 130 and the other end of which is hooked about a screw 144 on the block 116. The surface of the cam 138 is so shaped that when the tape engaging roller 94 is in its retracted position, it is out of the plane of the gap 22 in the table 20, to avoid interference with the tape as it is wrapped around the package and, as it is swung upwardly to package-engaging position, the cam 138 forces the block 116 outwardly against the resistance of the spring 140, moving the roller laterally into the plane of the gap 22, in position to engage the tape.

Figure 7:
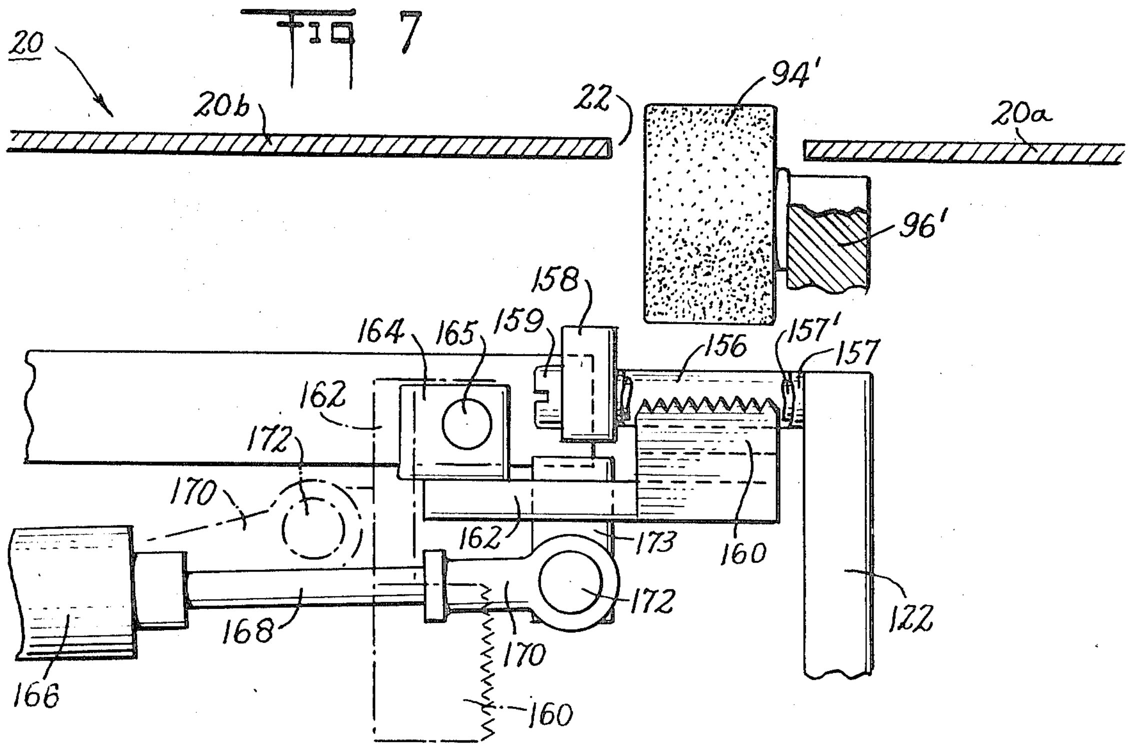

The tape holding and cutting mechanism is shown in FIGS. 5 and 7. The tape holder consists of a pair of spaced, parallel cylindrical sleeves 156 and 157 which are rotatably supported on cylindrical rods 156' and 157' at the upper end of the bar 122, the rods extending horizontally across the plane of the gap 22 with their outer ends being interconnected by a bar 158 secured to them by screws 159. The sleeves 156 and 157 are spaced below the table 20 a sufficient distance to permit the rollers 94 and 94' to pass between them and the bottom of the table. As the tape supply assembly completes its revolution around the table 20, the gummed surface of the tape T engages the lower surfaces of the sleeves 156 and 157, as shown diagrammatically in FIG. 10.

The tape cutting mechanism includes a serrated knife 160 mounted on an arm 162 extending from a block 164 rotatably supported on a rod 165 to permit pivotal movement of the arm 162 and knife 160. The arm 162 is actuated by an air cylinder 166 whose piston rod 168 is pivotally attached by a clevis 170 and a pin 172 to a bracket 173 projecting from the arm 162. The knife 160 is movable through an arc of approximately 90° between a retracted position, shown in broken lines in FIG. 7, at which it is out of the plane of the tape T, and an upper position, shown in full lines. As the knife swings upwardly from the former to the latter position, it passes between the sleeves 156 and 157 across which the tape is tautly stretched, thus severing the tape. As shown in FIG. 5, the arm 162 supports at its surface a pad 174 of resilient material which presses the gummed surface of the tape T against the sleeve 156 to hold the leading cut end of the unused portion of the tape in proper position for the start of the next cycle.

Figure 9:
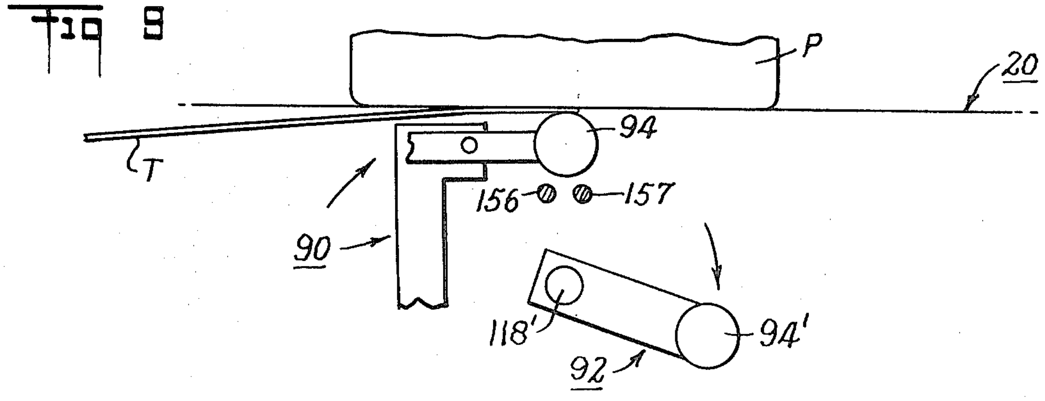
FIGS. 9, 10 and 11 are diagrammatic views of the machine shown in successive stages of a taping cycle.
Figures 10, 11:
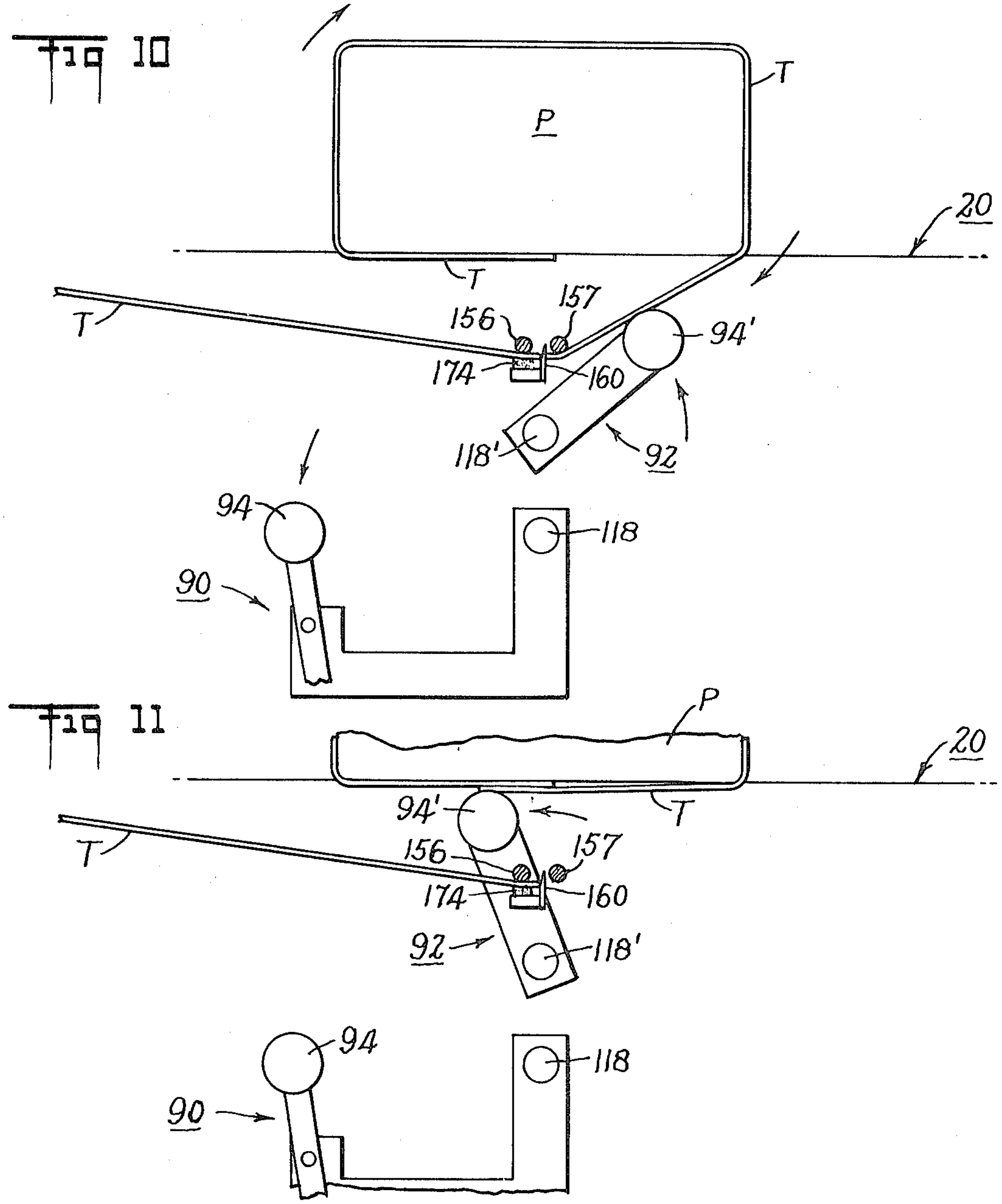
Figure 12:
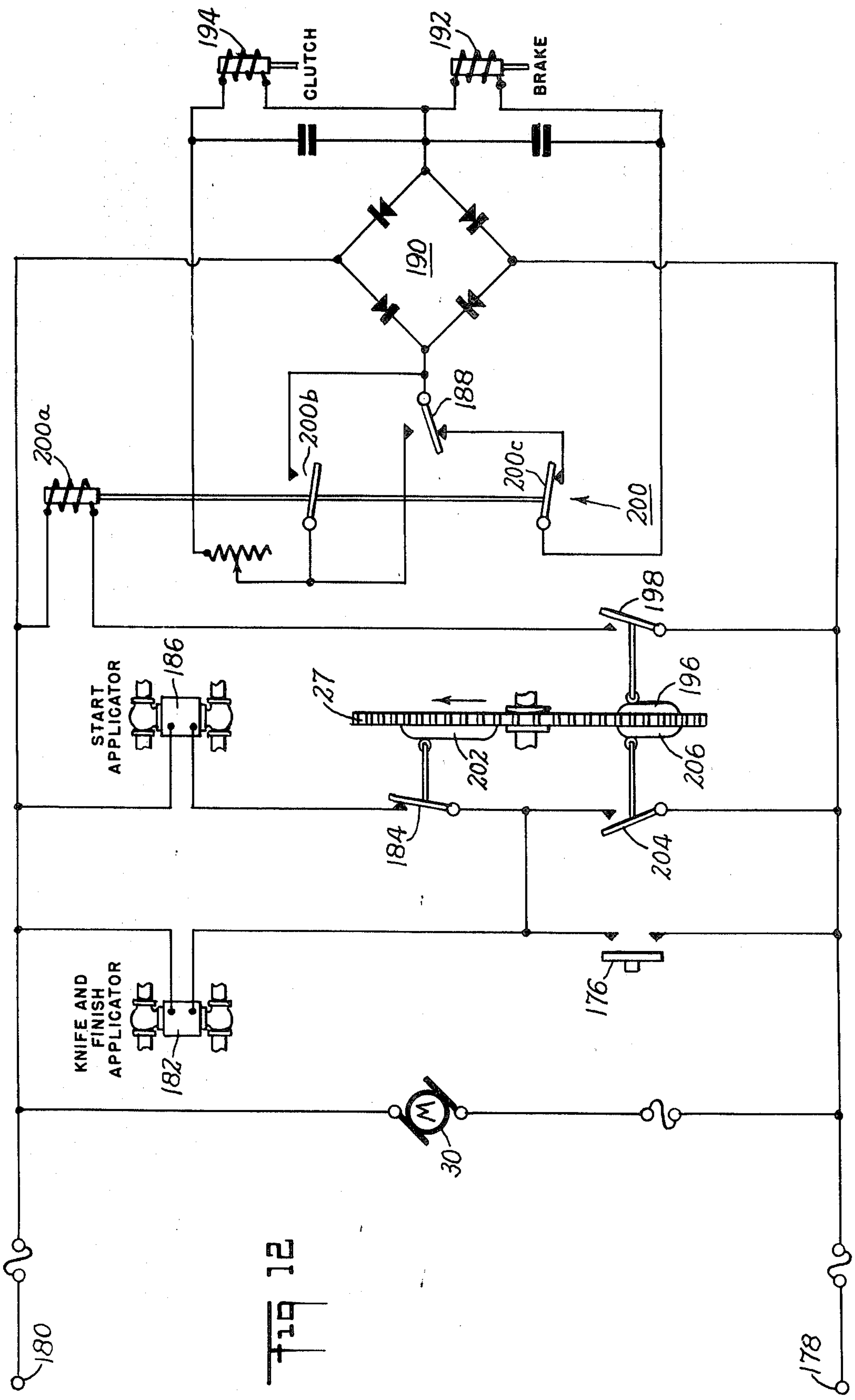
FIGURE 12 is a schematic electrical diagram of the control circuit of the machine.

The sequence of operation of the several mechanisms of the machine is diagrammatically illustrated in FIGS. 9, 10 and 11. FIG. 12 schematically illustrates the electrical circuit by which this sequence is controlled. After a package P is placed in proper position on the table 20, the operator depresses a foot switch 176 (FIG. 12), closing its normally open contacts and completing a circuit from the power lines 178 and 180 to the solenoid actuated valve 182 which controls the supply of compressed air to the air cylinder 166 (FIG. 7) which actuates the knife 160 and the air cylinder (not shown) which actuates the tape pressing roller 94', actuating these cylinders to move the knife 160 and roller 94' to their retracted positions.

Closure of the foot switch 176 also completes a circuit from the power lines 178 and 180 through the closed contacts of a switch 184 to the solenoid valve 186 which controls the supply of compressed air to the air cylinder (not shown) which actuates the tape applying roller 94, causing the roller 94 to swing upwardly, engaging the leading end portion of the tape and pressing it off of the holder sleeve 156 and against the bottom of the package, as shown in FIG. 9. The rotation of the sleeve 156 on the rod 156' allows the tape to peel smoothly from the sleeve without danger of breakage of the tape.

This movement of the arm on which the roller 94 is mounted actuates a single-pole, double-throw switch 188 (FIG. 12) from the position in which it is shown to its opposite position, breaking the circuit from the rectifier unit 190 to the solenoid 192 which actuates the brake and completing the circuit to the solenoid 194 which actuates the clutch. The releases the brake and engages the clutch, causing the motor 30 (FIG. 1) to drive the sprocket 27 and the tape supply assembly 24.

As soon as the rotation of the sprocket starts, a switch 204 is disengaged by a cam 206 on the sprocket 27, which has been in engagement with the switch in the stopped position of the sprocket, allowing the normally closed contacts of the switch to reclose and maintaining the supply circuit to the solenoid valves 182 and 186 even after release of the foot switch 176. At the same time, another cam 196 on the sprocket disengages a switch 198, allowing its normally closed contacts to reclose and completing a circuit from the power lines 178 and 180 to the winding **200*a* of a relay 200, closing its contacts 200*b* to complete the circuit from the rectifier 190 to the clutch solenoid 194 even after release of the switch 188 to its original position, in which it is shown in FIG. 12, and opening its contacts 200*c* to keep the circuit from the rectifier to the brake solenoid 192** open. Thus the rotation of the tape supply assembly will continue for a full revolution, wrapping tape around the package.

After a sufficient length of tape has been applied to the package to prevent the leading end of the tape from being pulled from the package by the tension imposed on the tape, the switch 184 is disengaged by a cam 202 on the sprocket 27, allowing its normally open contacts to reopen and breaking the supply circuit to the solenoid value 186. The resulting actuation of the valve 186 reverses the connections from the compressed air supply to the double-acting air cylinder which actuates the roller 94, causing the roller to be moved to its retracted position as shown in FIG. 10.

As the tape supply assembly nears the end of its revolution around the table 20, the tape T is wrapped against the bottom of the tape holder sleeves 156 and 157, as shown in FIG. 10. At this point, the switch 198 is actuated by the cam 196 on the sprocket 27, opening its normally closed contacts and breaking the supply circuit to the winding **200*a* of the relay 200, de-energizing the clutch 194 and applying the brake 192 to stop the movement of the tape supply assembly. Simultaneously, the switch 204 (FIG. 12) is actuated by the cam 206 on the sprocket 27, opening its normally closed contacts and breaking the supply circuit to the solenoid valve 182, removing air pressure from the cylinder 166 (FIG. 7) which actuates the knife 160 and reversing the connections to the double-acting air cylinder (not shown) which actuates the presser roller 94'. This allows a return spring contained within the cylinder 166 to swing the knife 160 upwardly to cut the tape, as shown in FIG. 11, and causes the roller 94' to swing upwardly to press the trailing end portion of the tape from the sleeve 157 and against the bottom of the package in overlapping relation with the leading end. The pad 174 holds the leading end of the unused portion of the tape against the holder sleeve 156** preparatory for the next cycle.

As the sprocket 27 substantially completes its revolution, and after the switch 204 has been opened, the switch 184 is engaged by the cam 202 and reclosed, preparatory for the next cycle, which will start upon reclosure of the foot switch 176.

The overrunning clutch 38 (FIG. 1) allows the tape to be rotated relative to the tape supply assembly 24 only in the direction in which it rotates as tape is pulled from the roll. This prevents fouling or breakage of the tape, due to the "backlash" of the tape which otherwise tends to occur when the tape supply assembly stops suddenly at the end of its revolution about the table 20, due to the fact that the outer half of the tape roll, being farther from the axis of rotation of the assembly, has greater momentum than the inner half. Since the tape roll cannot readily pull the tape back from the tension rollers, the tape roll is abruptly braked against such inertial rotation and tends to "bounce" in the opposite direction, unwinding the tape and creating a loose strand of tape which either might get fouled on the next cycle, or might result in snapping of the tape due to a sudden application of tension on the tape by inertial rotation of the loose roll of tape on the next cycle.

It will therefore be appreciated that the present invention provides a machine whereby the aforementioned and other apparent desirable objectives are achieved. However, it should be emphasized that the particular machine shown in the drawings and described herein is intended as merely illustrative of the principles of the invention and not as restrictive of the scope thereof which is defined only by the appended claims.

I claim:

1. A machine for applying adhesive tape around packages, said machine comprising a package support divided into two generally coplanar sections separated by a gap of a width at least equal to that of said tape, a tape supply assembly mounted for movement in an orbital path about said package support in a plane parallel to said gap, tape roll support means for rotatably supporting a tape supply roll on said tape supply assembly, a tape holder comprising two spaced tape support members mounted in said plane for engaging and supporting a web of tape extending from said tape supply assembly to said package, a tape cutter for severing said tape between said tape support members and leaving the two resulting cut ends adhering respectively to said tape support members, a tape applying element movable from a retracted position out of said plane and away from said package to a position in said plane and against said package to engage the leading end portion of said web of tape and press it off of one of said tape support members into adhering engagement with said package, a tape presser member mounted for movement from a retracted position out of said plane and away from said package to a position in said plane and against said package to engage the trailing end portion of the cut web of tape and press it off of the other of said tape support members into adhering engagement with said package adjacent said leading end, and drive means for first momentarily actuating said tape applying element to press the leading end portion of said web of tape off said tape holder and against said package, then moving said tape supply assembly through one revolution in said orbital path to wrap said web of tape around said package in said plane and against said tape holder, and finally actuating said tape presser member to press the trailing cut end portion of said web of tape against said package.

2. A machine as described in claim 1 in which said tape applying element holds the leading end portion of said web of tape against said package until a sufficient length of said tape has been applied to said package to prevent the tension of said web of tape from pulling said leading end portion off of said package.

3. A machine as described in claim 1 in which said tape cutter is mounted for movement in a plane passing between said tape support members and which includes tape cutter drive means for driving said tape cutter to cut said web of tape after said tape supply assembly has been moved through one revolution to wrap said web of tape around said package and against said tape holder.

4. A machine as described in claim 2 in which a clamping pad is mounted adjacent said tape cutter for movement therewith to clamp the leading cut end portion of said tape against said one tape support member, and in which said tape cutter drive means leaves said clamping pad in contact with said tape to positively clamp said leading end in position preparatory for the next cycle.

5. A machine as described in claim 1 in which said tape support members comprise rollers rotatably mounted to facilitate pulling the ends of said tape off of said tape support members.

6. A machine as described in claim 1 which includes adjustable drag means cooperating with said tape roll support means to resist rotation of said roll of tape and thereby increase the tension on said web of tape.

7. A machine as described in claim 1 in which said tape roll support means includes an overrunning clutch to permit rotation of said roll of tape in one direction as tape is pulled therefrom by rotation of said tape supply assembly about said package, but to prevent rotation of said roll of tape in the opposite direction.

References Cited

UNITED STATES PATENTS

| | | | |
|---|---|---|---|
| 2,504,059 | 4/1950 | Weber | 156—468X |
| 3,233,385 | 2/1966 | Lyon | 100—27X |

BENJAMIN A. BORCHELT, Primary Examiner

J. J. DEVITT, Assistant Examiner

U.S. Cl. X.R.

156—486, 523; 100—27